United States Patent [19]
Kemp

[11] Patent Number: 5,766,544
[45] Date of Patent: *Jun. 16, 1998

[54] PROCESS FOR FLUIDIZING PARTICULATE MATERIAL WITHIN A ROTATABLE RETORT

[75] Inventor: Willard E. Kemp, Houston, Tex.

[73] Assignee: Kemp Development Corporation, Houston, Tex.

[ * ] Notice: The term of this patent shall not extend beyond the expiration date of Pat. No. 5,407,498.

[21] Appl. No.: 616,590

[22] Filed: Mar. 15, 1996

[51] Int. Cl.$^6$ .................................................. C21B 11/06
[52] U.S. Cl. ........................................... 266/173; 148/630
[58] Field of Search ........................ 148/630, 513, 148/514; 266/252, 153, 173; 432/113, 117, 103, 108

[56] References Cited

U.S. PATENT DOCUMENTS

| | | | |
|---|---|---|---|
| 5,303,904 | 4/1994 | Kemp | 266/252 |
| 5,324,009 | 6/1994 | Kemp | 148/630 |
| 5,407,498 | 4/1995 | Kemp | 148/630 |

OTHER PUBLICATIONS

Brochure of Vacuum Industries, Inc. on "Rotavac" Furnaces, published Dec., 1989 in Nashua, NH, 4 page folder and 6 page insert.

"Primer on Fluidized Bed Heat Treating Furnaces", 9 pages, published prior to Jan. 1995 by Fluidtherm Corporation, South Lyon, Michigan.
Article entitled "Controlled Atmosphere Fluidised Beds For the Heat Treatment of Metals" by R.W. Reynoldson, Published Dec. 1976 in Great Britain, 15 pages.
Article entitled "Foundry Refines Fluidized Beds For Multiple Heat Treat Applications" by Willard E. Kemp, published Nov. 1980 in Heat Treating magazine, 5 pages.
Article entitled "Chemical Methods of Powder Production" by Erhard Klar, published prior to Jan. 1995, 4 pages.
Article entitled "NiCrAl/Bentonite Thermal SprayPowder For High Temperature Abradable Seals", by M.A. Clegg and M.H. Mehta, published prior to Jan. 1995 5 pages.
Technical Bulletin NTB9000 of Fike Corporation, Blue Springs, MO, Published Dec. 1990, 2 pages.
Catalogue of Niro, Inc., Columbia, MD entitled "Fluid Bed Processing", published prior to Jan. 1995, 16 pages.

*Primary Examiner*—Scott Kastler
*Attorney, Agent, or Firm*—Bush, Riddle & Jackson, LLP

[57] ABSTRACT

A method for fluidizing particulate material within a retort (22) mounted on a horizontal shaft or axle (36) for rotation. Gas enters retort (22) through a pipe (52) extending along the longitudinal axis of the shaft (36) and is exhausted through pipe manifold (58). As retort (22) is rotated, particles of particulate material (23) are constantly intermingled and in contact with each other and the walls (31) of the retort (22). An injector assembly (60) may be connected to a retort (51) for injection of an additional particulate material (56).

10 Claims, 3 Drawing Sheets and thermal condition of the retort. The injection of particulate material, such as a powder, reduces the internal temperature because the temperature of the injected powder or particulate material is below the temperature of the retort.

PROCESS FOR FLUIDIZING PARTICULATE MATERIAL WITHIN A ROTATABLE RETORT

FIELD OF THE INVENTION

This invention relates to a method for mechanically fluidizing particulate material within a rotatable retort, and more particularly to such a method which provides isothermal control of an exothermic or endothermic reaction of the particulate material with another material in the rotatable retort.

BACKGROUND OF THE INVENTION

U.S. Pat. No. 5,407,498 issued Apr. 18, 1995 and discloses a rotatable retort in which small metallic particles or particulate material within the retort are fluidized and a gas is injected within the retort. The retort is heated to a predetermined temperature and the injected gas is exposed to the small particles. In one example, an active gas enters the surface of the small metallic particles. In another example, a gas is introduced into the retort and reacts chemically or catalytically with the small particles to enhance the release of an active element, such as boron, from the metallic particles. The metallic particles may also be cooled after the particles are exposed to a desired temperature for a desired time.

As set forth in U.S. Pat. No. 5,407,498 metallurgical operations rely on the movement of certain elements within the solid matrix of the metal to be treated. Metallurgical operations rely on chemical reaction between elements which may be physically brought together or may be induced to come together by diffusion. An element is any chemical element or substance listed in the periodic table. Elements move within the solid metal by a process of diffusion. Diffusion is encouraged when an element is attracted to another element with which it is more reactive within the same contiguous metal structure. Diffusion also occurs when metals tend to form a more homogenous solid solution. Diffusion of an element from one metal to another or between a gaseous atmosphere and a metal also takes place when the materials are in intimate contact. The employment of precise pressures is often desirable to assist in this transfer.

As an example, fine metal particles or powders of nickel and aluminum can be intermixed and brought to a temperature well below the melting point of either metal and they will react to form a nickel aluminide intermetallic compound. The combining of nickel and aluminum powders produces substantial amounts of heat. This heat can raise the temperature of operation, which further speeds the combination and eventually an uncontrolled or runaway operations can happen. Temperatures can be produced which are sufficient to melt the powders so that they agglomerate together in an undesirable mass.

Water atomized iron particles or powders which contains excess carbon and oxygen can be reduced by a combination of diffusion within the powder and chemical reactions at the surface. The oxygen is generally an oxide on the surface of the powder but the carbon is diffused throughout. By bringing the powders into intimate contact in the pressure of hydrogen, a reaction is generated at the surface whereby carbon and oxygen combine to form a carbon oxygen gaseous compound and hydrogen and oxygen combine to form gaseous water. Carbon within the powder migrates by diffusion to the surface and reacts with the oxygen. Heat must be added to initiate the reactions and good thermal transfer helps maintain constant temperatures which are important for a controlled reaction. In some cases, the reaction changes from endothermic to exothermic as the carbon is dissipated and hydrogen begins to combine directly with the remaining oxygen.

Ideally, the elements in the fluidizing process to undergo a reaction will be brought into intimate contact with each other and will be held in contact for sufficient time for the chemical reaction to take place. Further, it is important that if heat is to be added during the reaction, it must be added with great uniformity so that the reaction takes place at the desired temperature. In the case of those reactions which generate heat it is even more important to have good thermal transfer so the heat can be removed from the operation to avoid an undesired rise in temperature.

The process or method as shown in U.S. Pat. No. 5,407,498 was not concerned with maintaining the exothermic or endothermic reactions of the particulate material at a precise uniform temperature during fluidizing within a rotating retort by (1) precisely controlling the addition of heat to the retort or the release of heat from the retort to match the heat loss or gain to or from the retort resulting from chemical reactions within the retort, and (2) precisely adding or injecting another material into the rotatable retort during fluidizing of the initial particulate material in the retort so that heat generated or lost matches the heat induced to or exiting from the retort as a result of said injection of particulate material.

SUMMARY OF THE PRESENT INVENTION

The present invention is directed to a method for mechanically fluidizing small metallic particles within a retort mounted for rotation about a horizontal axis, and particularly to such an apparatus and method which includes the isothermal control of an exothermic or endothermic reaction of the small metal particles with another material injected into the rotatable retort. An endothermic reaction is a process or change that takes place with the absorption of heat whereas an exothermic reaction is a process or change that takes place with the creation or evolution of heat. It is desired that such an endothermic or exothermic reaction be controlled under a uniform or constant temperature, (i.e. an isothermal control). The temperature of the reaction can be controlled by adding or removing heat as necessary during rotation of the retort. A precise isothermal control may be maintained during the exothermic or endothermic reaction.

The material injected into the retort during rotation may comprise a particulate material and the rate of injection for particulate material also controls the rate of reaction between the injected particulate material and the initial particulate material already in the retort.

A mechanically fluidized retort provides the heat transfer, intimacy and residency with little gas flow because the fluidization does not require the passage of gas through the material. Fluidization is mechanical so the gas may stay in residence within the fluidized mass long enough for the desired reactions to take place. The fluidization action results in near constant movement of particles relative to each other so they do not stick together even at relatively high temperatures. Nevertheless, the heat transfer rate in a mechanically fluidized device is sufficient to control the temperature of the reaction by adding or removing heat as necessary. The injection of material into the retort, particularly particulate material, during rotation of the retort and fluidizing of particulate material within the retort, is at a predetermined controlled rate to control the rate of reaction between the particulate material within the retort and the material being added to the retort.

It has also been found possible to further control the rate of reaction by maintaining a totally inert atmosphere until a pre-determined temperature is reached after which a reactive gas or powder is injected to create or abet the desired reaction within the retort. By combining the very precise control of injection of reactive material with the excellent thermal conductivity created within the fluidized mass, it is possible to control reactions such as the reduction of copper which has proved extremely difficult in previous equipment which does not combine the controlled introduction of reactive material such as hydrogen with the temperature uniformity capable in a fluidized mass.

Thus, the present invention provides an unexpected capability to maintain a precise isothermal condition for exothermic and endothermic reactions. The process and apparatus may be utilized for the treatment of various small metallic particles. For example, aluminum particles may be utilized to coat small nickel particles or powders. Another example is in the reduction of the oxygen content and carbon content of small iron particles.

The term "powder" as used in the specification and claims is interpreted as small particles or particulate material having a size of between around 1 micron and 250 microns. An optimum particle size of between 10 microns and 100 microns is desirable for most uses of the present invention.

DESCRIPTION OF THE INVENTION

A sealed horizontal retort is supplied, subtended on at least one axle. Gas ingress and egress means are provided within the axle so that the atmosphere within the retort can be controlled and monitored by exterior means while the retort is heated and rotated. Fine particles of the metal to be treated are placed in the retort so the particles are placed in near constant motion as the retort is rotated. The speed of rotation and the diameter of the retort are chosen to maximize the fluid-like behavior of the particles. The term fluidization describes a state of relative motion and partial separation of particles generated by rotary motion of the retort. Although a vacuum may be maintained within the retort, very high rates of heat transfer exist between the retort walls and the particles, and any other items placed within the retort. Further, there is a constant vigorous mixing of the particles within the retort so that individual particles make intermittent contact with the retort walls and with each other and with any other object placed within the retort, such as workpieces.

Figure 1:
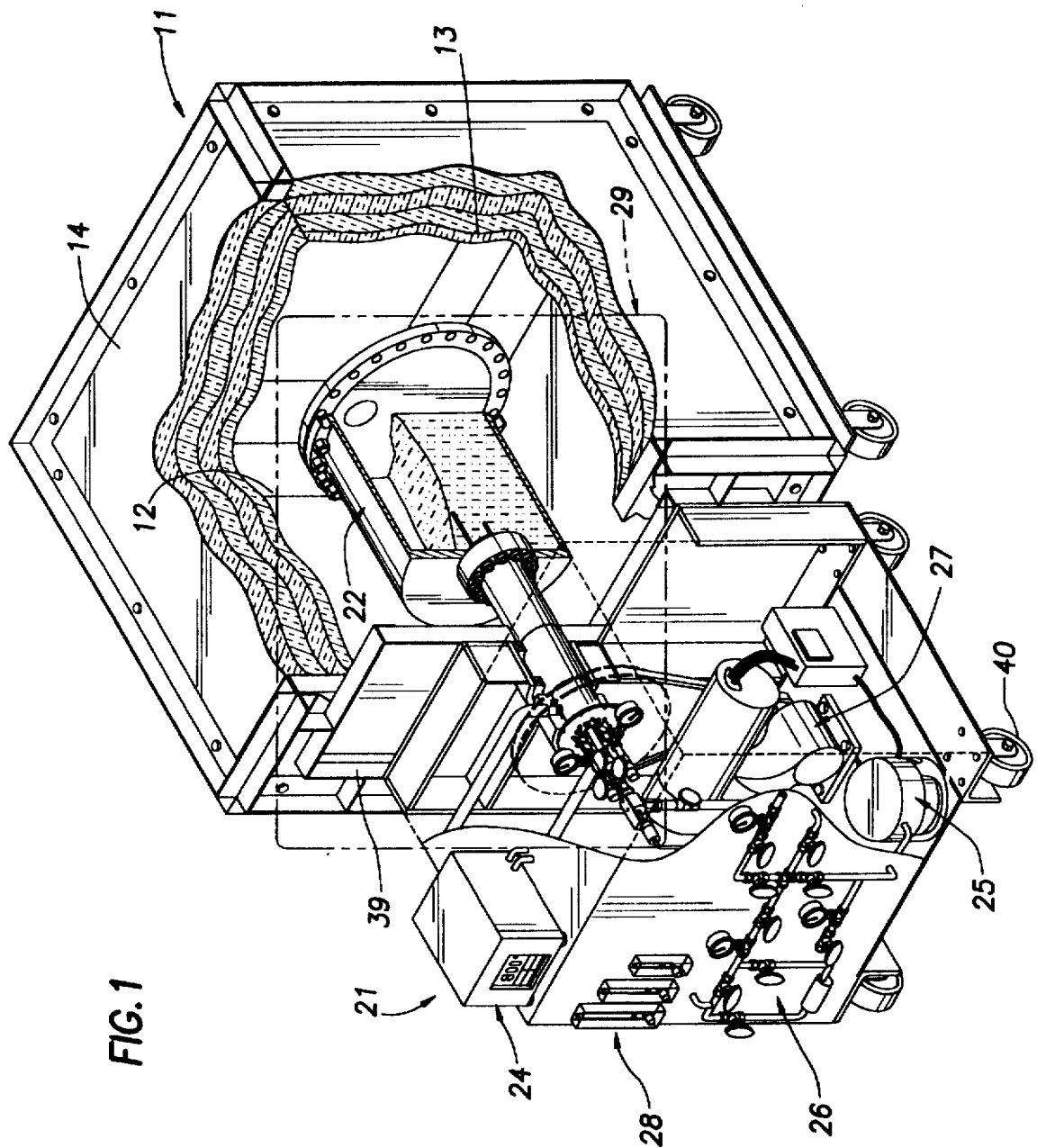
FIG. 1 is a perspective of the treatment apparatus with certain parts broken away and showing a preferred embodiment of the retort.
Figure 2:
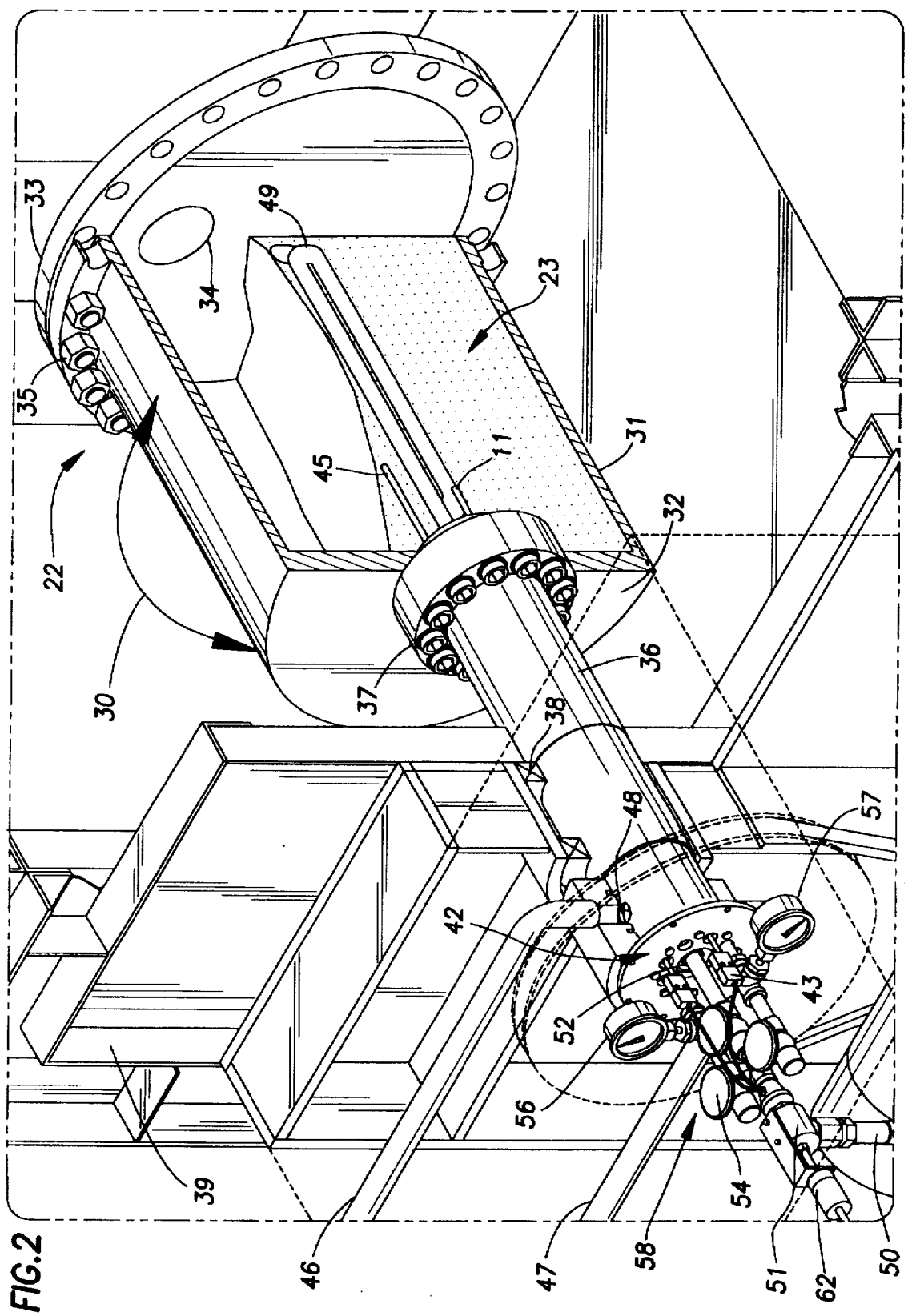
FIG. 2 is an enlarged fragment noted at 29 of FIG. 1 showing the retort and its relationship with the mounting axle and control devices.

Referring to the drawings for a better understanding of the invention, the apparatus consists of two principal components. In FIG. 1 and FIG. 2 a heater unit is shown generally at 11 and a processing unit is shown at 21. Heater unit 11 has heater coils 12 and insulation 13 supported by frame 14 surrounding the retort 22 containing particles or beads 23. The processing unit 21 is under control of computer 24 and is equipped with a vacuum pump 25, a gas control manifold 26, a motor drive 27, and flow control devices 28. Arrows 30 indicates direction of rotation.

Retort 22 consists of cylindrical section 31, integral end cover 32, and a removable cap 33 having an access port 34. Removable cap 33 is secured to cylindrical section 31 by means of bolts and nuts 35. Retort 22 is mounted to axle 36 by means of bolts 37. Axle 36 is mounted on bearings 38 mounted integrally with insulated closure 39. Insulated closure 39 is mounted to move with the processing unit 21. Processing unit 21 is mounted on wheels 40 so that processing unit 21 can be engaged and disengaged with heater unit 11. When processing unit 21 is pulled completely away from heating unit 11, one may then gain access to retort 22. Axle 36 is equipped with numerous passageways indicated generally at 42 which communicate through the axle 36 into the retort 22. Thermocouple connections 43 pass through axle 36 and are shown extended into the interior of retort 22 at their sensing ends 44 and 45. Cooling ports 46 and 47 bring cooling fluids into the axle 36 and take spent fluid away from the axle. Said cooling fluid is directed through ports 48 in the axle 36 and thence into U-tube 49 located within the retort 22 so that cooling fluid may be passed through U-tube 49 which is in continuous contact with particles 23 so as to transfer heat quickly and uniformly therebetween.

Gas enters the processing unit 21 through line 50 and through swivel joint 51 and thence through pipe 52 into the interior of the retort 22. Exhaust gas exits from the retort 22 through pipe manifold 58. Gages 56 and 57 measure the pressure within the retort 22. Valves 54 may be opened to control gas exiting the retort 22. Thermocouple wires connecting to thermocouple connections 43 exit through swivel 51 and through commutator 62.

In the typical operation, processing unit 21 and heater unit 11 are separated to provide access to retort 22. Access port 34 is opened and particles 23 are placed into the retort to the extent of about sin (60) percent full. Access port 34 is then closed with the cover (not shown). Bolts and nuts 35 are tightened to assure a good seal between cover 33 and retort 31. Processing unit 21 is then placed in cooperative attachment with heater 11 so that retort 22 is entirely engaged within heater 11. The only connection to the exterior is through axle 36. Drive motor 27 is then activated to rotate the axle 36 and the retort 22. It has been found advisable to rotate one direction for a period of time and then reverse the direction. For some operations this is not necessary. Gas controls 26 are then operated to create the desired pressure within retort 22. Heater units 12 are activated to heat the exterior of retort 22.

As retort 22 is rotated, particles 23 are constantly intermingled and in contact with each other and the interior of retort 22 and transmit heat from retort wall 31 uniformly throughout the particles 23. Simultaneously gas mixtures into the retort 22 are thoroughly mixed by the action of the particles 23 so that all particles 23 are thoroughly and uniformly exposed to each other and to the gaseous atmosphere.

In some cases, all atmosphere may be withdrawn from retort 22 through the use of vacuum pump 25. Particles 23 will continue to transmit heat with uniformity within the interior of retort 22. After particles 23 have been exposed to the desired temperature for the desired time, the unit may be quickly cooled by moving cooling fluids through pipe 46 through passageway 48 and U-tube 49 and out pipe 47 so that particles 23 through their continuous contact with U-tube 49 will transmit their heat thereto and into the cooling fluid contained within U-tube 49.

Figure 3:
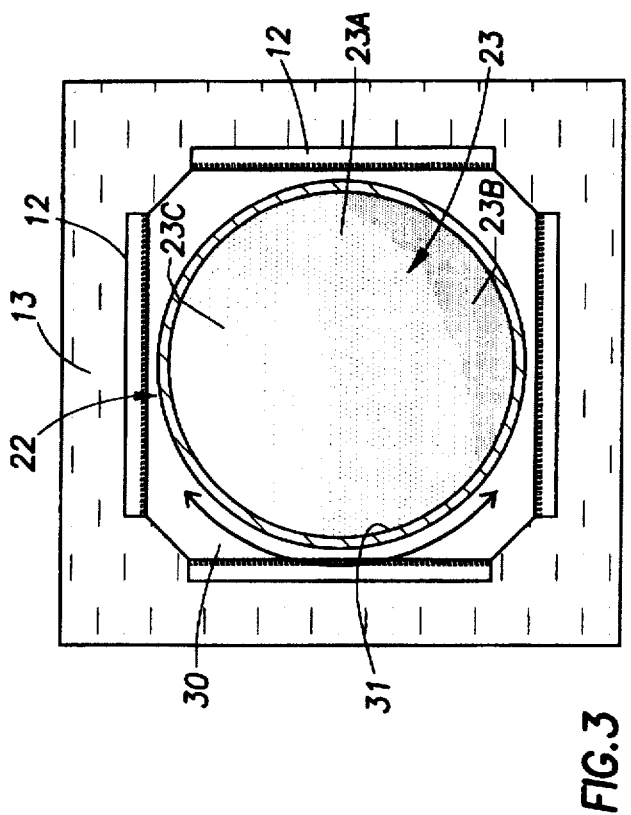
FIG. 3 is a schematic cross section of the retort showing the fluidization action which occurs under proper rotation.

Referring to FIG. 3, the fluidization action of particles 23 results in lowermost particles 23B being unfluidized, upper particles 23C fluidized excessively and the majority of particles 23A fluidized at the desired rate for most efficient heat transfer and mixing. Rotation at speeds of 5 to 40 revolutions per minute result in nearly continuous fluidization of all particles 23.

Figure 4:
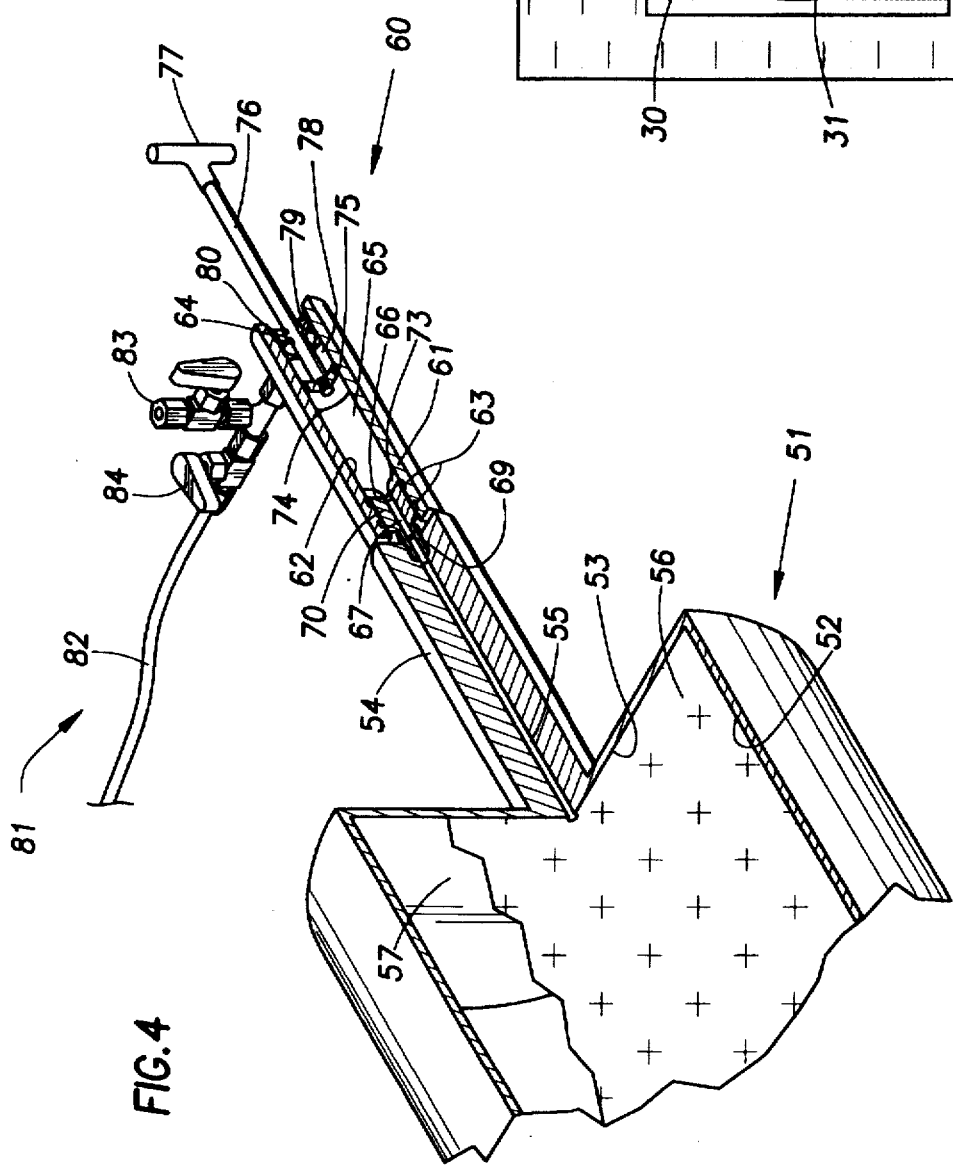
FIG. 4 is a perspective of a separate embodiment showing a powder injection device connected to a retort with certain parts broken away to illustrate the operation.

Referring to FIG. 4, a modification of a retort is shown attached to an injection device for the purpose of injecting additional powders into the retort while it is rotating, heating and under controlled atmosphere. A portion of the retort is shown generally as 51 consisting of inner wall 52, endwall 53 and extended neck section 54 containing an injection port 55. Powder 56 is contained within the retort 51. A gas atmosphere 57 in the interior of the retort 51 permeates through powder material 56. Some of powder 56 and gas 57 can permeate through port 55.

Attached temporarily to retort 51 is injector assembly 60. Injector assembly 60 may be temporarily attached to extended neck section 54 of retort 51 by means of thread 69. When the injector assembly 60 is not attached, a plug (not shown) may be engaged to thread 69 to seal the end of extended neck section 54.

Injector assembly 60 consists of cylinder 61 having inner wall 62 and seals 63. Contained within cylinder 61 is commutator 70 which rotates with retort 51. Commutator 70 is engaged to extended neck section 54 of retort 51 through thread 69. Commutator 70 is the only portion of injector assembly 60 which rotates with retort 51. All other parts of injector assembly 60 are stationery with respect to retort 51. Seals 63 seal between cylinder inner wall 62 and commutator 70. End seal 73 is made of a flexible material such as rubber so it seals against inner wall 62 of cylinder 61 and against the back surface 66 of commutator 70. Cavity 65 is formed within cylinder 61, behind end seal 73 and communicates through port 67 within commutator 70 to injection port 55 in extended neck section 54 of retort 51. Further defining cavity 65 is piston 74. Piston 74 has seal 75 sealing against inner wall 62 of cylinder 61. Piston 74 is made from a gas permeable material and is permanently attached to rod 76 having handle 77 which allows rod 76 and piston 74 to be moved along the interior of cylinder 61. Chamber 78 is formed behind piston 74. Chamber 78 is further defined by endpiece 79 having seal 64 which seal against the interior wall 62 of cylinder 61 to complete the formation of chamber 78. End assembly 79 is retained in place by snap ring 80. Gas manifold 81 having gas supply line 82, bypass valve 83 and inlet valve 84 directs a suitable gas to the interior chamber 78.

During normal operation of retort 51, the injector assembly 60 is not usually connected to retort 51. Retort 51 containing gas 57 and powder 56 is heated and rotated without injector assembly 60 during normal operation. For use of injector assembly 60 with retort 51, snap ring 80 is removed from injector assembly 60 and endpiece 79, piston 74, rod 76 with handle 77 are removed. Additional powder 56 is placed in interior cavity 65. Piston 74, rod 76, with endpiece 79 are then reinstalled and snap ring 80 is reinstalled. The entire injector assembly 60 is then attached to retort 51 by means of thread 69.

To purge all air from the system, gas 57 within retort 51 is then allowed to flow through powder 56, through injection port 55 and commutator port 67 into the interior of injector assembly 60 into cavity 65, thence through permeable piston 74 into chamber 78 and thence through connections to bypass valve 83 to the atmosphere. Operation is continued for a period of time to exhaust air from the interior of injector assembly 60. Valve 83 is then closed and valve 84 is opened and a desired gas contained in gas supply line 82 is injected into chamber 78. Gas then flows from chamber 78 through the permeable walls of piston 74 through the solid material contained in cavity 65 through port 67 and injection port 55 into the interior of retort 51. When desired to inject solid material from chamber 65 into the interior of retort 51, rod 76 is moved forward to physically push the material through commutator port 67 into port 55 and thence into the interior of retort 51. Progress of the operation is noted by the position of rod 76 extending out of the end of cylinder 61. Gas flowing from chamber 78 through the permeable piston 74 will slightly fluidized the solid material in chamber 65 so that it may move more readily through port 55 into the interior of retort 51. If necessary, rod 76 may be attached to a threaded device so that the movement of piston 74 may be more closely constrained. It is also possible that rod 76 may be attached to a mechanical device to automatically move rod 76 forward at a desired rate.

As an example of use, copper oxide particles were loaded into the retort and temperature was increased to approximately 570 Kelvin with an argon atmosphere contained within the retort. When a temperature of 570 K was reached, small amounts of hydrogen were mixed with the argon, increasing the amounts until the exothermic reaction created by hydrogen reacting with the copper oxide to produce pure copper and water was matched by the cooling rate of the retort. When the temperature of 570 K was reached, all heat to the retort was discontinued. The retort was maintained at a constant temperature of 570 K merely by controlling the rate of injection by hydrogen which reacted exothermically with the copper oxide forming water and pure copper. The experiment continued for more than an hour during which time the temperature of the heating devices had been reduced to less than 430 K and the temperature within the retort was maintained at 570 K solely by controlling the introduction of hydrogen to create an exothermic reaction whereby the heat generated by said reaction matched the heat dissipated from the retort. As the heating system cooled, the retort became hotter in respect to the surrounding surface, therefore, the rate of heat dissipation increased. By increasing the amount of hydrogen injection it was still possible to maintain an isothermal condition within the retort.

In another test, nickel and aluminum powders were similarly loaded and heated to 675 K under argon. In this test, the temperature of 675 K was maintained for 30 minutes after which a sample of material was exacted by allowing the retort to pressurize to about 10 psig, then opening a small port into the retort allowing the pressure differential to push out a sample. The temperature was then raised in 50 degree increments holding at each temperature increment for about 30 minutes and taking a sample after each hold period. By the time a temperature of 920 K had been reached, the samples were found to contain nickel and aluminum which had reacted with each other to form a nickel aluminide.

Another example which produced unexpected results was the formation of a thin film of aluminum nitride on small particles of aluminum, ranging in average size from 5 to 20 microns. The aluminum powder was loaded into the retort and heated to 670 K under argon atmosphere. The atmosphere was then changed to ammonia and the temperature held for 4 hours. The temperature was then increased over a period of 4 hours to 870 K and held for an additional 6 hours. Temperature was then increased to 973 K and held for a period of 6 hours. Examination showed only a total nitrogen content of 0.2%. The powder was still free flowing even though held at 973 K, which is about 50 degrees above the melting point of aluminum. Analysis later showed the powder within the thin nitride shell did melt at around 920 K. The powder was heated to above 1270 K and then was cooled again and the metal again froze when the temperature was cooled below around 910 K. The nitride shell had sufficient strength and continuity to retain within it the molten aluminum and prevent it from coalescing with adjacent powders.

Another example of use is the reduction of water atomized steel powder with carbon. Carbon is frequently used for the partial removal of oxygen from iron powders but seldom is the process complete. The reason lies in the variable presence of oxygen in the iron. If too much carbon were added it would reduce all of the oxygen present and then excess carbon would remain in the iron, possibly carburizing the iron. To avoid this, carbon is generally used for only a partial reduction of the oxygen in water atomized steel powder. Hydrogen is then added to remove the remaining oxygen as water vapor. With the mechanical fluidizing device it is possible to complete the entire reduction with carbon without adding undesirable excess carbon. Because the retort motion constantly fluidizes and homogenizes the mixture within the retort, any carbon added to the metal or mixed with iron in the retort is intimately connected with the oxygen, immediately forming a carbon oxygen compound such as carbon monoxide. The effluent of the retort can be monitored with gas detection equipment.

When the temperature is brought to above approximately 920 K, carbon in the iron reacts with oxygen until all the carbon is depleted. Until the carbon is depleted, the effluent contains a carbon oxygen compound, mixed with the argon. After all of the iron from within carbon in the iron is depleted, the effluent changes to argon, indicating a completion of the reaction. Additional carbon is then injected into the retort and additional oxygen is removed as a carbon oxygen compound. This process is continued until the addition of small amounts of carbon produces no more oxygen in the effluent. At that point it is known that all of the oxygen has been removed from the iron, yet no significant amount of carbon has been added.

As a means of initially proving this theory, a retort was loaded with water atomnized steel containing about 2% oxygen in purity. The steel also contained about 0.7 percent carbon. An additional 1% by weight carbon was added to the mixture. The retort interior was blanketed with argon and heated to 920 K for a period of eight hours. Samples were extracted every thirty minutes. Examination of the samples showed constantly decreasing amounts of oxygen until at the end of the test, the oxygen content was less than half the initial amount. Some additional carbon remained but because the temperature was so low, insignificant amounts of this carbon entered the steel. In the production scheme the effluent would have been monitored to determine when oxygen ceased to be extracted. Instead of all the carbon being premixed with the steel, a certain amount of the carbon would be injected into the mixture, with injection ceasing as soon as the effluent indicated a lack of oxygen being removed.

Another method of removing carbon and oxygen from iron powder utilizes hydrogen. Iron powder was loaded into the retort and heated under argon to 1120 K. Argon was injected into the retort until 1120 K was reached after which hydrogen was injected into the retort. Temperature was maintained for three hours. The carbon in the iron diffused to the surface of the powder and reacted with some of the oxygen to form a carbon-oxygen gaseous effluent which was drawn off the retort. After the carbon was removed the hydrogen reacted with the remaining oxygen to form water which was drawn away by vacuum. The vacuum on the conduit leading gas away from the retort prevents the water from condensing in the exit conduit and commutator.

Another example of the use of the device where the precision control is needed is in the coating of carbon powders with tin. In this operation, carbon powders having a particle size less than 60 mesh and greater than 200 mesh were mixed by weight with fine tin powders, having a particle size smaller than 44 microns. Three pounds of tin powder were mixed with every pound of carbon. The tin being very much heavier, presented therefore the smaller volume of the two. Tin melts at a temperature near 500 K with a temperature of approximately 90% of melting or around 450 K being necessary to render the tin in a soft enough state that it will bond to carbon particles to which it came in contact. Powders were placed in the retort and the retort was purged and then filled with argon to create a perfectly inert mixture into which the tin and carbon could react. Temperature was brought slowly to 450 K and held within a temperature of 440 K to 450 K for a period of several hours. The fine tin powders joined to the surface of the larger carbon particles so that each carbon powder was completely coated in a cocoon of tin. It was found by trial and error that temperatures in excess of 480 K resulted in substantial amounts of tin forming into balls rather than attaching to the carbon. Temperatures lower than 400 K did not result in substantial coverage of the carbon with tin.

An ample of the benefits of precise temperature control with low vacuum is shown in the removal or "de-hydriding" of reactive metals such as tantalum, zirconium, titanium, hafnium and niobium. In certain manufacturing processes these metals are "hydrided" or combined with hydrogen to make them brittle so they can readily be ground into fine powder. The powder must then be "dehydrided" to remove the hydrogen to restore malleability to the powder. Removal of hydrogen requires heating the powder to high temperature under very high vacuum such as 0.00001 Torr. The vacuum normally prevents uniform heating because vacuum is such a good insulator. The high temperatures often 1100 K or higher causes powder to agglomerate.

A further precaution against agglomeration is the addition of inert spheres of metal or ceramic into the retort amongst the powders to be treated. These additional microspheres must have a rounded or semi-spherical shape and the smallest microsphere must be larger than the largest workpiece powders to allow subsequent separation. Nitrided stainless steel powders are suitable for use with most powder workpieces such as titanium which has a very high affinity for oxygen. For those workpiece powders such as iron which have less affinity for oxygen, zirconia peening shot has proved satisfactory. Semi-spherical powder in the range of 100 to 500 microns has proved useful. Shot as large as 1500 microns has also been used but thermal transfer is somewhat diminished. Powders are often separated from each other through use of screens having carefully made uniform holes of selected sizes. Most powders have a range of particle sizes. Screens are made in standard sizes such as 60, 80, 100, 150, 200, 270 and 325 sizes which refer to the number of holes in a standard section of screen. The workpiece powder must be measured such as by screening to determine the largest particle size. The additional microspheres must then be selected so that the smallest particle therein will not pass through a screen at least one size larger than that which captures the largest particle in the workpiece powder.

By placing the powders in a rotatable retort and fluidizing the powder while heating it and drawing a vacuum, the tendency to agglomerate is minimized and the exacting temperature prevents hot spots or temperature excursions which would otherwise increase the agglomerating tendency.

While the process has been described for metallic powders or particulate materials, it is to be understood that the process of this invention may be utilized with non-metallic powders, such as coating a kaolin workpiece with zirconium oxide, coating a ferrous alloy workpiece with silicon carbide, or coating a nickel alloy workpiece with aluminum oxide, for example.

While preferred embodiments of the present invention have been illustrated in detail, it is apparent that modifications and adaptation of the preferred embodiments will occur to those skilled in the art. It is to be expressly understood that such modifications and adaptations are in the spirit and scope of the present invention as set forth in the following claims:

What is claimed is:

1. In a processing system including an enclosed a generally cylindrical retort mounted on a generally horizontal axle for rotation and having walls containing an initial particulate material which is fluidized upon rotation of said retort, means to control pressure and atmosphere within said retort at a selected rate, means to heat or cool said retort at a controlled rate, and means to inject additional material into said retort through said axle while said retort is rotated and heated or cooled; a process for treating said initial particulate material comprising:

rotating said retort at a rate sufficient for fluidizing said initial particulate material within said retort to transfer a change in temperature rapidly between particles of said initial particulate material and between said initial particulate material and the walls of said retort; said initial particulate material having a particle size less than about 250 microns:

heating said retort to a selected temperature;

injecting additional material through said axle into said initial particulate material to effect a reaction with said initial particulate material for the generation or release of heat;

controlling the rate of injection of said additional material to provide a desirable rate of reaction; and controlling the addition or release of heat from said retort to maintain said selected temperature at a uniform rate; the rate of rotation and the diameter of said retort being selected to maximize the fluid behavior of said particles.

2. The process as set forth in claim 1 wherein the step of injecting additional material includes injecting additional particulate material for reacting with said initial particulate material for the generation or release of heat.

3. The process as set forth in claim 1 wherein the step of injecting additional material includes injecting additional gaseous material for reacting with said initial particulate material for the generation or release of heat.

4. The process as set forth in claim 1 wherein said initial particulate material is mixed with a supplemental powder selected from a material which will not react with said additional material, said supplemental powder having a minimum size at least greater than the maximum size of said initial particulate material.

5. In a processing system including an enclosed retort mounted about a generally horizontal axle for rotation, said retort having walls containing an initial particulate material selected from a group consisting of aluminum, titanium, zirconium, hafnium or tantalum, which is fluidized upon rotation of said retort, said axle having within itself an inlet conduit connecting to said retort at one end and to a swivel connection at its other end, means to control pressure and atmosphere within said conduit and said retort, and means to heat or cool said retort at a selected rate; a method for creating a continuous nitride film having a thickness between 1 and 50 nanometers on said initial particulate material said method comprising:

placing said particulate material in said retort rotating said retort at a selected rate for fluidizing said particulate material within said retort to transfer heat rapidly between particles of said particulate material and between said particulate material and the walls of said retort;

heating said retort to a selected temperature;

injecting through said inlet conduit a gas containing nitrogen;

maintaining a nitrogen containing gaseous atmosphere within said retort: and controlling the addition or release of heat from said retort to maintain said selected temperature at a uniform level.

6. The process as set forth in claim 5 wherein said initial particulate material is mixed with a supplemental powder selected from a material which will not react with said initial particulate material, said supplemental powder having a minimum screen size at least one screen size greater than the largest of said initial particulate material.

7. In a metal processing system including an enclosed retort mounted about a generally horizontal axle for rotation, said retort having walls for containing aluminum powder which is fluidized upon rotation of said retort, said axle having within itself a first conduit connecting to said retort at one end and to a swivel connection at its other end, said swivel connection connecting to a second conduit in fluid communication with said first conduit, said system having means to control pressure and atmosphere within said conduits and said retort, and means to heat or cool said retort at a predetermined rate; a method for creating a continuous nitride film having a thickness of not more than 50 nanometers on said aluminum powder; said method comprising:

placing said aluminum powder in said retort rotating said retort at a selected rate for fluidizing said aluminum powder within said retort to transfer heat rapidly between particles of said aluminum powder and between said aluminum powder and the walls of said retort;

injecting ammonia into said retort through at least one of said conduits;

heating said retort to a temperature of around 670 K;

holding the temperature of said retort at 670 K for 2 to 6 hours;

then heating said retort to 970 K;

holding the temperature of said retort at 970 K for 2 to 6 hours; and heating said retort to a temperature of 970 K over a period of 2 to 6 hours assuring that the total time above 670 K and below 800 K is a minimum of 8 hours.

8. The process as set forth in claim 1 including the step of maintaining an inert atmosphere in said retort until said selected temperature is reached.

9. The process as set forth in claim 8 wherein the step of maintaining an inert atmosphere comprises the injection of argon within said retort.

10. The process as set forth in claim 8 wherein the step of maintaining an inert atmosphere comprises the application of a vacuum to said retort.

* * * * *